(12) United States Patent
Cavaliere et al.

(10) Patent No.: US 12,378,989 B2
(45) Date of Patent: Aug. 5, 2025

(54) PARTIALLY POLYMERISED THERMOHARDENABLE CONNECTION PART AND METHODS FOR PRODUCING AND ASSEMBLING SUCH A CONNECTION PART

(71) Applicant: ArianeGroup SAS, Paris (FR)

(72) Inventors: Fréderick Cavaliere, Montigny-le-Bretonneux (FR); Florian Leborgne, Montigny-le-Bretonneux (FR); Fabrice Boil, Herblay (FR)

(73) Assignee: ArianeGroup SAS, Paris (FR)

( * ) Notice: Subject to any disclaimer, the term of this patent is extended or adjusted under 35 U.S.C. 154(b) by 834 days.

(21) Appl. No.: 17/260,674

(22) PCT Filed: Jul. 16, 2019

(86) PCT No.: PCT/FR2019/051777
§ 371 (c)(1),
(2) Date: Jan. 15, 2021

(87) PCT Pub. No.: WO2020/016516
PCT Pub. Date: Jan. 23, 2020

(65) Prior Publication Data
US 2021/0262518 A1 Aug. 26, 2021

(30) Foreign Application Priority Data
Jul. 19, 2018 (FR) ........................................ 1800780

(51) Int. Cl.
*F16C 11/06* (2006.01)
*B29C 43/14* (2006.01)
*B29C 43/18* (2006.01)

(52) U.S. Cl.
CPC .......... *F16C 11/0657* (2013.01); *B29C 43/14* (2013.01); *F16C 11/0695* (2013.01); *B29C 2043/185* (2013.01); *F16C 2326/47* (2013.01)

(58) Field of Classification Search
CPC .......................... F16C 11/0657; F16C 2326/47
See application file for complete search history.

(56) References Cited

U.S. PATENT DOCUMENTS 3,237,278 A * 3/1966 White ................... F16C 33/201
156/212
3,238,602 A * 3/1966 White ............... B29C 45/14754
29/898.048

(Continued)

FOREIGN PATENT DOCUMENTS

FR 3001408 A1 8/2014
FR 3023210 A1 1/2016

(Continued)

OTHER PUBLICATIONS

Search Report issued in French Patent Application No. 1800780 dated May 24, 2019.

(Continued)

*Primary Examiner* — Matthew R McMahon
(74) *Attorney, Agent, or Firm* — McDonald Hopkins LLC

(57) ABSTRACT

A partially polymerised thermohardenable connection part and to methods for producing and assembling such a connection part are described herein. The connection part for connecting two mechanical parts is thermohardenable and is partially polymerised in such a way as to be rigid at room temperature and able to be subjected to a subsequent polymerisation, the connection part being thus both sufficiently rigid to be able to be manipulated and brought into contact with at least one of the two mechanical parts which it is to interconnect and able to be subjected to a subsequent additional polymerisation in order to achieve its final (Continued)

polymerised state, the material of the connection part being rendered sufficiently soft during the additional polymerisation that it can adapt to the form of at least one of the mechanical parts to which the connection part must be connected.

10 Claims, 5 Drawing Sheets

(56) References Cited

U.S. PATENT DOCUMENTS

| | | | | |
|---|---|---|---|---|
| 3,507,527 | A * | 4/1970 | White | F16C 11/0685 403/140 |
| 3,944,376 | A * | 3/1976 | Hata | F16C 11/0685 403/138 |
| 5,265,495 | A * | 11/1993 | Bung | F16C 11/0633 403/120 |
| 5,427,467 | A * | 6/1995 | Sugiura | F16C 11/0685 403/140 |
| 5,752,780 | A * | 5/1998 | Dorr | F16C 11/0633 403/135 |
| 6,267,341 | B1 * | 7/2001 | Fleming | B23Q 17/20 248/181.2 |
| 6,857,809 | B2 * | 2/2005 | Granata | F16B 5/126 296/214 |
| 8,376,647 | B2 * | 2/2013 | Kuroda | B60G 7/005 403/134 |
| 8,550,741 | B2 * | 10/2013 | Kuroda | F16C 11/0685 403/135 |
| 9,321,219 | B2 * | 4/2016 | Zahlen | B29C 65/5057 |
| 9,746,122 | B2 * | 8/2017 | Olsen | F16M 7/00 |
| 10,367,245 | B2 | 7/2019 | Kerkour et al. | |
| 10,711,830 | B2 * | 7/2020 | Englebright | F16C 11/08 |
| 11,167,616 | B2 * | 11/2021 | Kuroda | B21D 53/10 |
| 11,359,665 | B2 * | 6/2022 | Kondoh | F16C 11/0685 |
| 11,781,588 | B2 * | 10/2023 | Leborgne | F16C 11/10 403/90 |
| 2014/0342786 | A1 * | 11/2014 | Ulkem | C08G 18/725 455/575.9 |
| 2017/0210188 | A1 | 7/2017 | Meyer et al. | |
| 2019/0003523 | A1 * | 1/2019 | Kuroda | B60G 7/005 |
| 2020/0144705 | A1 | 5/2020 | Leborgne | |
| 2022/0243761 | A1 * | 8/2022 | Kuroda | F16C 11/0657 |

FOREIGN PATENT DOCUMENTS

| | | | | |
|---|---|---|---|---|
| WO | | 2008071657 | A1 | 6/2008 |
| WO | WO-2013037395 | A1 * | 3/2013 | B60R 11/02 |

OTHER PUBLICATIONS

International Search Report for Application No. PCT/FR2019/051777 dated Oct. 29, 2019.
Written Opinion for PCT/FR2019/051777 dated Oct. 29, 2019.

* cited by examiner

PARTIALLY POLYMERISED THERMOHARDENABLE CONNECTION PART AND METHODS FOR PRODUCING AND ASSEMBLING SUCH A CONNECTION PART

This is the National Stage of PCT international application PCT/FR2019/051777, filed on Jul. 16, 2019 entitled "PARTIALLY POLYMERISED THERMOHARDENABLE CONNECTION PART AND METHODS FOR PRODUCING AND ASSEMBLING SUCH A CONNECTION PART", which claims the priority of French Patent Application No. 1800780 filed Jul. 19, 2018, both of which are incorporated herein by reference in their entirety.

TECHNICAL FIELD

The present invention relates to a connection part made of composite material, intended to create a connection between a first mechanical part and a second mechanical part, and methods for producing and assembling such a connection part.

PRIOR ART

Such a connection part made of composite material is intended to be used in any field, in particular space and aeronautics but not exclusively, requiring an operation of structural assembly with at least one other mechanical part (or structure) having a variable shape at the connection interface.

Although not exclusively, the present invention applies more particularly to a satellite antenna reflector, for example for telecommunications. Such an antenna reflector generally comprises a rigid structure made of composite material (called shell) provided with a reflecting surface (which is reflective for radio-frequency waves) and a reinforcing structure at the rear of this surface also made of composite material, which participates in maintaining the shell and in the connection with the satellite.

In the use for such a spatial structure, during the creation of the antenna reflector, the shell of the reflector, light and having a complex shape, must be assembled with the rear (reinforcing) structure via several connection parts. In general, these connection parts are made of composite material. In general, each of these connection parts has the shape of an angle bar, and it must be adapted in particular to the interface on the shell side and also on the rear structure side. For the fastening of these connection parts, gluing is carried out cold while trying to generate the least possible stress during the assembly, in order to not induce a deformation of the shell.

Thus, each of these connection parts (of the angle bar type) must be adapted in particular to the interface with the shell, which requires a large number of parts, a lot of time for the choice of the suitable part as well as for the operation of assembly by gluing at ambient temperature.

There is therefore a need to simplify the operation of assembly of a connection part of this type, while preserving good reliability of the connection created.

DISCLOSURE OF THE INVENTION

The goal of the present invention is to propose a solution allowing in particular to simplify the implementation of a connection between two mechanical parts. It relates to a connection part made of composite material, intended to create a connection between a first mechanical part and a second mechanical part.

According to the invention, said connection part made of composite material is thermohardenable, and it is partially polymerised in such a way as to be rigid at ambient temperature and capable of being subjected to a final later polymerisation.

A thermohardenable part is a part made of plastic material which, under the action of heat, progressively hardens to reach an irreversible solid state.

Moreover, polymerisation designates the chemical reaction by which small molecules react with each other to form molecules having higher molar masses. The initial molecules are monomers (or pre-polymers), the synthesis leading to polymers. In general, in the presence of reactants and catalysts, and under the action of heat and pressure, macromolecular chains are formed consisting of identical or different repeating units, connected covalently. Polymers, having possibly high molar masses, coming from the polymerisation of monomers are thus obtained.

In the context of the present invention, "partially polymerised" (or "partial polymerisation") means the fact that the connection part has been subjected to a process of polymerisation having generated a modification of the material of said connection part, which has become sufficiently rigid at ambient temperature to be able to be manipulated, but the polymerisation of which is not completely finished to obtain a polymer with the corresponding properties. Advantageously, the partial polymerisation rate is between 20% and 75%, and more particularly between 25% and 60%. This material must be subjected, during the fastening (or assembly) to a mechanical part, to an additional polymerisation, to be completely polymerised and become a polymer.

Thus, via the invention, a connection part is obtained that, simultaneously:
 is sufficiently rigid at ambient temperature to be able to be manipulated and be brought into contact with at least one of the two mechanical parts that it must connect together; and
 must be subjected to a later additional polymerisation to be in its final polymerised state. During this later polymerisation, the material of the connection part, rigid at ambient temperature in the partially polymerised state, is made sufficiently soft during the rise in temperature to be able to adapt to the shape of the mechanical part(s) to which the connection part must be connected.

It is thus possible to produce standard (partially polymerised) connection parts, which can be adapted during a later assembly (via a final polymerisation) to the variable shape of the associated mechanical part(s).

It is thus possible to standardise this type of connection part, which allows to reduce the creation costs and facilitate the assembly, while preserving (or while improving) the mechanical strength and the reliability of the connections created. The improvement is due to a hot gluing rather than a usual gluing carried out at ambient temperature.

Advantageously, the connection part is provided, at a first end intended for the connection to the first mechanical part, with a substantially flat surface.

Moreover, advantageously, the connection part is provided, at a second end intended for the connection to the second mechanical part, with a housing. Preferably, it also includes a ball that is mounted in the housing.

Moreover, in a specific embodiment, the connection part is provided at least with a metal element mounted in a wall of the housing. This metal element integrated into the part during the production can correspond to an insert with an inner thread with a view to an assembly by screw.

Moreover, in a specific embodiment, the connection part is provided with metal or polymerised composite elements mounted on inner walls of the housing in order to maintain the geometry of the housing during the final polymerisation.

The present invention also relates to a method for producing a connection part such as that specified above.

According to the invention, said production method is a method for compression moulding, and it includes at least:
- a step of drape forming in a mould with non-polymerised pre-impregnated material; and
- a step of partial polymerisation, under pressure and at temperature, of said material.

Advantageously, the step of partial polymerisation is implemented to carry out a partial polymerisation of the material with a partial polymerisation rate between 20% and 75%, that is to say that the material is (partially) polymerised between 20% and 75%. Preferably, the partial polymerisation rate is between 25% and 60%.

In a specific embodiment, said production method also includes at least one of the following steps:
- before the step of drape forming, a step of positioning metal elements (or inserts) in the mould; and
- between the step of drape forming and the step of partial polymerisation, a step of integrating a fabric to be delaminated (or delamination fabric or peeling fabric) capable of acting as a protection of the surface that will be at the gluing interface. This fabric is to be peeled off just before the assembly.

The present invention further relates to a method for assembling a connection part such as that specified above.

According to the invention, said assembly method includes at least one step of final polymerisation of the (partially polymerised) connection part which is brought into contact at least with one of said mechanical parts.

Advantageously, said assembly method also includes:
- before the step of final polymerisation of the connection part, a step of conforming with local heating of the connection part brought into contact at least with one of said mechanical parts, preferably using a portable heating tool; and/or
- a step of adding an adhesive film at the interface with said mechanical part; and/or
- a step of installing a ball (in the housing of the connection part) and of assembling the ball with a mechanical part, followed by a step of gluing the ball into its housing once its position has been adjusted.

BRIEF DESCRIPTION OF THE DRAWINGS

The appended drawings will make clear how the invention can be carried out. In these drawings, identical references designated similar elements. More particularly.

DETAILED DESCRIPTION

Figure 1:
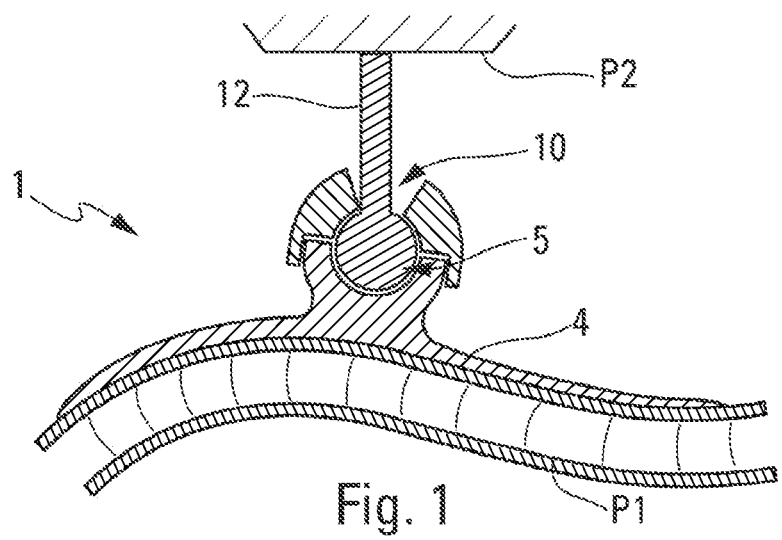
FIG. 1 is a cross-sectional diagram of a connection part according to a specific embodiment, which connects together two mechanical parts.

The connection part 1 schematically shown in a specific embodiment in FIG. 1 is intended to create a connection between two distinct mechanical parts P1 and P2.

In the example shown in FIG. 1, the mechanical part P1 comprises a composite sandwich structure. This sandwich structure includes, for example, a honeycomb core, on either side of which skins are affixed, as specified below in reference to FIGS. 10 and 11. Each of the skins can be provided with one or more plies of composite material with, for example, carbon fibres.

The connection part 1 is made of composite material.

Moreover, according to the invention, said connection part 1 is thermohardenable, and it is partially polymerised in such a way as to be, on the one hand, rigid at ambient temperature, in the states of FIGS. 2 to 5 in particular, and on the other hand, capable of being subjected to a final later polymerisation.

In the context of the present invention, "partially polymerised" (or "partial polymerisation") means the fact that the connection part 1 has been subjected to a polymerisation method (or production method described below) having generated a modification of the material of said connection part 1, which has become sufficiently rigid at ambient temperature to be able to be manipulated, but the polymerisation of which is not completely finished to obtain a polymer with the corresponding properties. The partial polymerisation rate is between 20% and 75%, and more particularly between 25% and 60%.

This material must be subjected during the fastening or the assembly (to at least one of the mechanical parts P1 and P2) to an additional polymerisation (during an assembly method described below) to be completely polymerised and form, in an irreversible manner, a three-dimensional network.

Consequently, the connection part 1 is, simultaneously:
- sufficiently rigid at ambient temperature to be able to be manipulated and be brought into contact with at least one of the two mechanical parts (that it must connect together); and
- capable of being subjected to a later additional polymerisation, to be brought into its final polymerised state. During this later polymerisation, before reaching the final level of polymerisation, the material of the connection part 1 (which is rigid at ambient temperature in the partially polymerised state) is made sufficiently soft during the rise in temperature to be able to adapt to the shape of the mechanical part(s) to which the connection part 1 must be connected, and in particular to the shape of the mechanical part P1.

It is thus possible to produce standard (partially polymerised) connection parts 1, which can be adapted during a later assembly (via a final polymerisation) to the shape of the associated mechanical part(s). The standardisation of the connection parts 1 allows to reduce the creation costs and facilitate the assembly, while preserving (or while improving) the mechanical strength and the reliability of the connections created.

In a preferred embodiment, shown in FIGS. 2 to 5, the connection part 1 is provided, at a first end 2A intended for the connection to a first of the mechanical parts, for example to the mechanical part P1 of FIG. 1, with a supporting part 4 (or base) provided with a substantially flat surface 3.

This flat surface 3 can later be adapted to surfaces having different shapes of the mechanical part P1 (by passing through a softened state during a final polymerisation).

Moreover, in a specific embodiment, the connection part 1 is provided, at a second end 2B which is opposite to the end 2A and which is intended for the connection to the second mechanical part, for example to the mechanical part P2 of FIG. 1, with a housing 5 provided with a wall 6.

Figure 4:
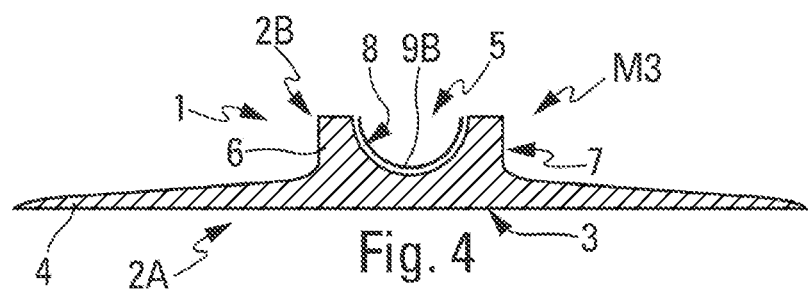
Figure 5:
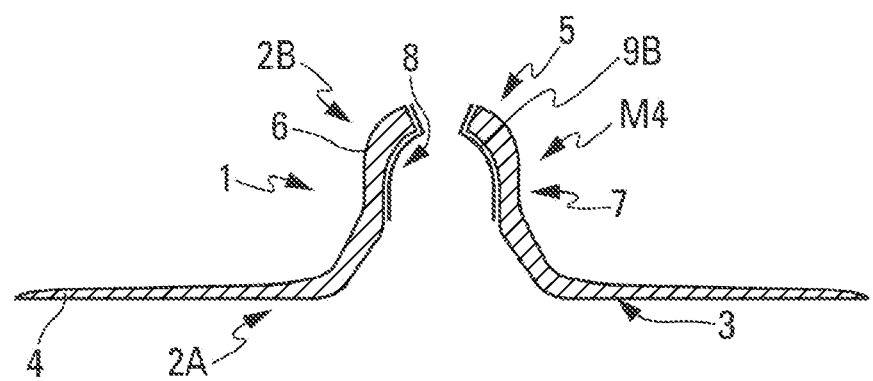

The embodiments M1 to M4 of FIGS. 2 to 5 differ from each other by the shape of the housing 5 and/or of the wall 6 of said housing 5. The wall 6 can have outer edges 7 having different shapes, for example rounded (FIGS. 2 and 3), rectilinear (FIG. 4), or more complex (FIG. 5).

Likewise, the wall 6 can have inner edges 8 having different shapes, with preferably at least one substantially hemispherical part.

Figure 2:
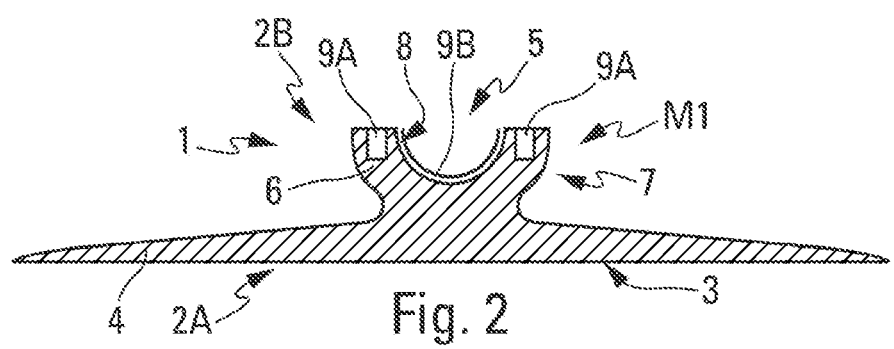
FIGS. 2 to 5 schematically illustrate, in a cross-section, in a non-exhaustive manner, various embodiments of the connection part.
Figure 3:
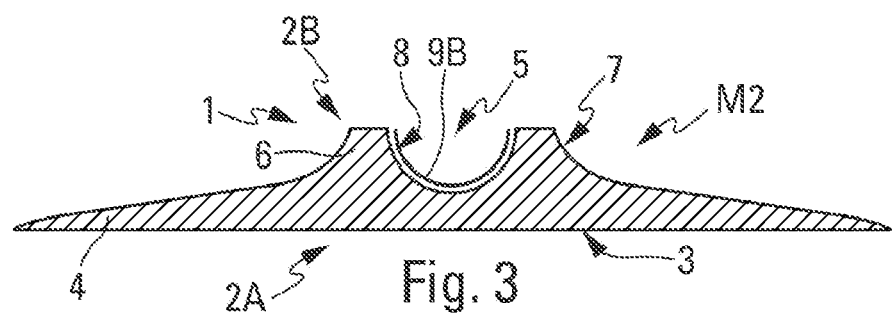

Moreover, in a specific embodiment, the connection part 1 is provided with one or more metal (or made from another material, for example composite) elements 9A that are mounted in the wall 6 of the housing 5, as shown in FIG. 2, and/or with one or more metal (or made from another material, for example composite) elements 9B that are mounted on the surface of the inner walls of the housing, as shown in FIGS. 2 to 5. The function of the elements 9B mounted on the inner surface is to maintain the inner geometry of the housing in order to be able to position a ball during a later operation. The connection part can also include, in particular at the wall 6, holes or recesses (not shown).

In the preferred embodiments, shown in FIGS. 6A to 9, the connection part 1 is provided with a ball 10 that is arranged in the housing 5.

The ball 10 comprises a spherical part 11 intended to be inserted into the housing 5 and a rod 12 rigidly connected to the spherical part 11.

The connection part 1 is connected to one of the mechanical parts via the rod 12 of the ball 10, as shown in FIG. 1 for the mechanical part P2. The rod 12 can be metal or composite and it can be threaded.

The connection part 1 also comprises a maintaining element 13 (or upper part of the housing) that is fastened onto the wall 6 (after positioning of the ball 10) to form a spherical housing 5, intended to surround the upper part 11 of the ball 10.

The connection part 1 thus comprises a housing 5 to be able to position a fastener with a ball 10, in order to allow adjustments of the assembly to a mechanical part P2, after an assembly of the connection part 1 with the mechanical part P1. This possibility of adjustment is due to the possibility of orienting the rod 12 of the ball 10 (fastened to the mechanical part P1), by rotating the spherical part 11 of the ball 10 in the housing 5. When the position is adjusted, the ball 10 can be fastened in the housing 5, for example by gluing at ambient temperature.

Figure 6A:
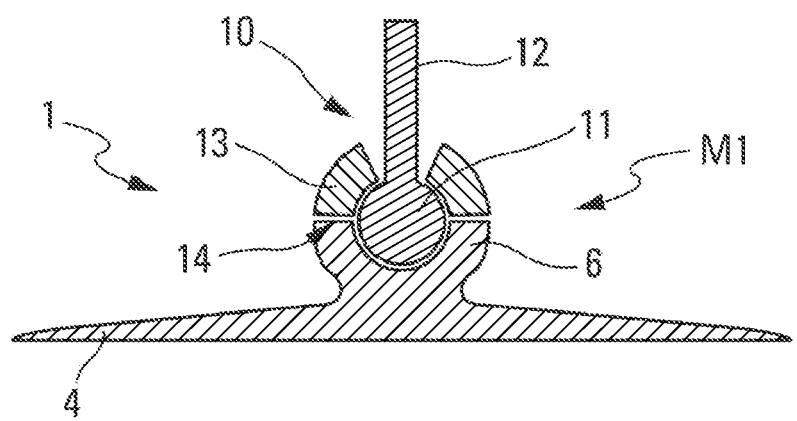
FIGS. 6A, 6B and 7 to 9 schematically illustrate, in a cross-section, in a non-exhaustive manner, various embodiments of the connection part provided with a ball.
Figure 6B:
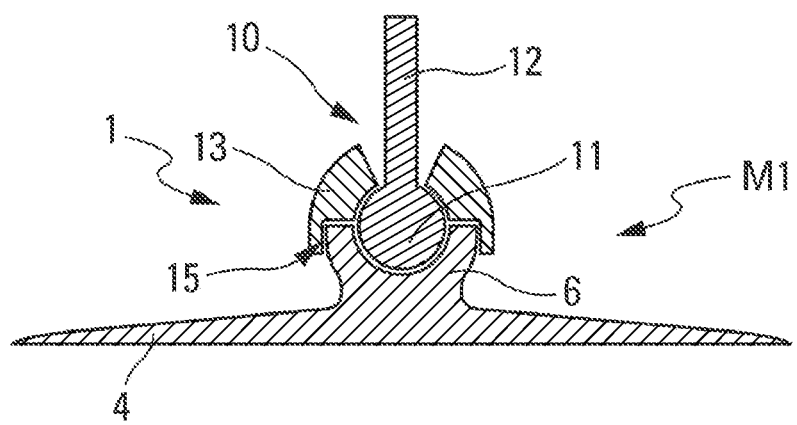

FIGS. 6A and 6B show two different examples of gluing of a maintaining element 13 onto the wall 6, respectively with a flat contact 14 and with an edge 15, for the embodiment M1 of FIG. 2 (without a metal element 9A).

Figure 7:
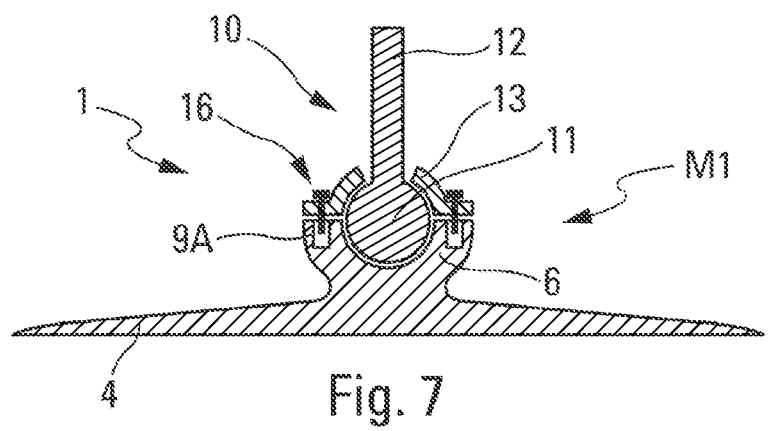
Figure 8:
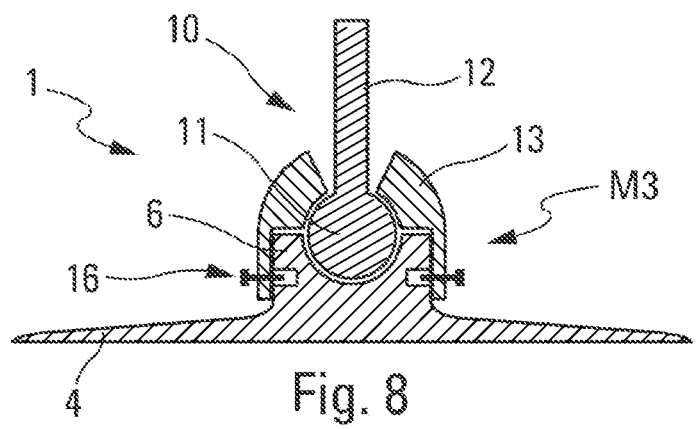

FIGS. 7 and 8 show two different examples of fastening of a maintaining element 13 onto the wall 6 via fastening elements 16 such as screws for example, which are for example associated with metal elements 9A with an inner thread mounted in the wall 6 during the drape forming of the parts, for the embodiments M1 and M3 of FIGS. 2 and 4, respectively.

Figure 9:
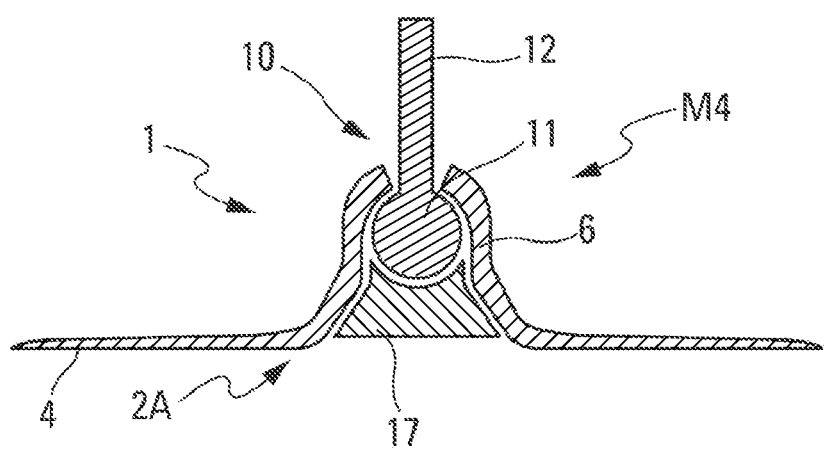

Moreover, in the example of FIG. 9 corresponding to the embodiment M4 of FIG. 5, a plug 17 made of pre-polymerised composite material is added after insertion of the ball 10 between the end 2A of the connection part 1 and the spherical part 11 of the ball 10. This plug 17 closes the hosing of the ball before assembly of the connection part 1 and final polymerisation. Metal or completely polymerised composite elements (or parts) can be mounted on the inner surfaces of the housing in order to maintain a good geometry of this housing during the final polymerisation of the assembly. An adhesive film can be mounted at the interface between the part 2A and the plug 17 during the positioning of this plug 17.

The connection part 1, as described above, can be used in any field, in particular space and aeronautics but not exclusively, which requires an operation of structural assembly with at least one mechanical part (or structure) having a variable shape at the connection interface.

Figure 10:
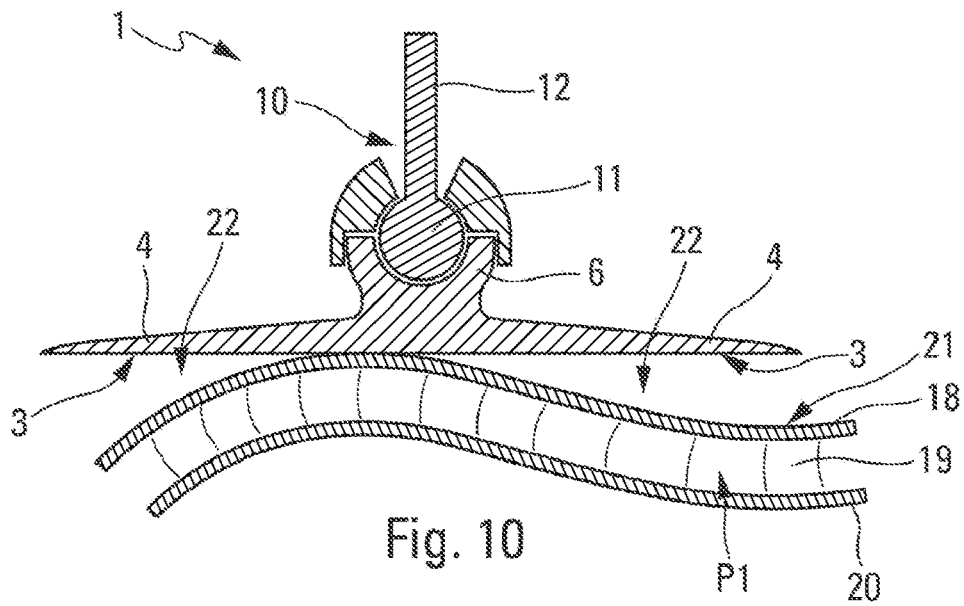
FIGS. 10 and 11 schematically illustrate, in a cross-section, two successive situations during the assembly of the connection part to a mechanical part.
Figure 11:
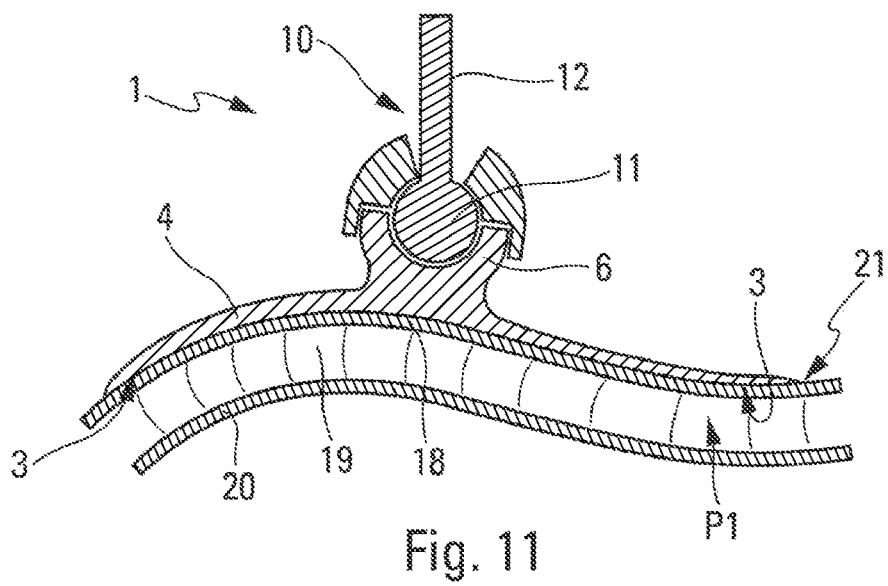

More particularly, the connection part 1 can be a space part made of composite material, in particular a part of the "pad" type, allowing the junction with the shell of an antenna reflector of a satellite, having a variable shape at the assembly interface. Usually, an antenna reflector of a satellite comprises a shell provided with a "front" surface, which is capable of reflecting electromagnetic waves, and a reinforcement system that is arranged on a "rear" surface, which is opposite to the front surface. This reinforcement system comprises a main structure called rear structure, as well as other usual elements and means allowing in particular to fasten the reflector onto the satellite considered. The goal of the reinforcement system is to maintain the shell and ensure the connection of the shell to the satellite. In a preferred embodiment, the shell of the reflector comprises a composite sandwich structure. This sandwich structure P1 comprises, for example, a honeycomb core 19, which is transparent to radioelectric waves, and onto which a front skin 20 and a rear skin 18 are affixed, as shown in FIGS. 10 and 11. Each of the skins 18 and 20 comprises one or more plies of composite material with, for example, carbon fibres. The material forming the front skin 20 (that is to say the reflective front surface) of the shell must allow to guarantee a reflection of the electromagnetic waves. The use of connection parts 1 (such as that described above) for fastening the shell allows, in particular, to minimise the number of connection parts 1 and to simplify their positioning on the shell.

Figure 12:
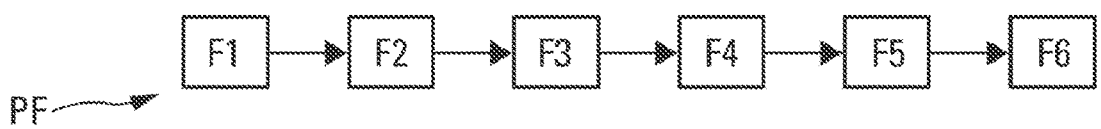
FIGS. 12 and 13 schematically present the main steps of a method for producing and of a method for assembling a connection part, respectively.

The connection part 1, as described above, can be produced using a production method PF shown in FIG. 12.

This production method PF is a method for compression moulding. Said production method PF includes at least:
  a step F2 of drape forming in a mould (having an adapted shape) used for the compression moulding, with non-polymerised pre-impregnated material. The material can be a ply consisting of unidirectional fibres and/or fabric, with carbon, glass or Kevlar fibres, for example; and
  a step F5 of partial polymerisation of said material.

The step F5 involves applying a cycle of pressure/temperature partial polymerisation adapted to the pre-impregnated material used, with a press with heated plates and/or a heated mould.

The method for compression moulding allows to obtain net-shape parts with a possibility of positioning metal mounted elements (or inserts) and holes during the production phase.

Said production method PF can also include at least one of the following steps:
- before the step F2 of drape forming, a step F1 of integrating into the mould metal elements 9A, 9B such as those shown for example in FIG. 2;
- between the step F2 of drape forming and the step F5 of partial polymerisation, an optional step F3 of integrating a fabric to be delaminated (or delamination fabric or peeling fabric, namely "peel ply"). This step F3 allows to integrate a fabric to be delaminated, dry or pre-impregnated, in particular at the locations of the gluing interfaces that are to be created later.

The method PF also includes, between step F2 or F3 and step F5, a step F4 of closing the mould and of positioning the mould under a press.

The method PF finally comprises a step F6 of removing the connection part 1 from the mould, without removing, if necessary, the fabric to be delaminated in order to protect the surfaces until the gluing (or assembly) phase. This fabric is to be peeled off just before the gluing operation.

With regard to the material used, the base monomer of the epoxy resin is, preferably, mainly of the DGEBA (for DiGlycidyl Ether of Bisphenol A), TGPAP (for TriGlycidylParaAminoPhenol), or TGMDA (for TetraGlycidyl MethyleneDiAniline) type. The hardening agent is of the amine type, for example of the DDS (for DiaminoDiphenyl Sulfone) type.

In a first alternative embodiment of said production method PF, for a use in a method for drape forming in an open mould, there is:
- once the drape forming of the prepreg has been finished, with or without a fabric to be delaminated, a step of positioning the environmental products and the vacuum bag usually used. The environmental products can include a former (or smoothing sheet) under the vacuum bag;
- a step of partial polymerisation of the laminate in an autoclave or in an oven; and
- a step of removing the connection part from the mould without removing the fabric to be delaminated, in order to protect the surface of the connection part until the gluing operation (during the assembly).

In this first alternative of the production method PF, in general there are no mounted elements and/or holes during the drape forming phase. Moreover, the connection part obtained is not net-shape and generally requires deburring and/or trimming.

Moreover, in a second alternative of said production method PF, for a use in an injection method, there is:
- a step of placing the dry preform consisting of plies or of dry fabrics in the tools, with or without a fabric to be delaminated, before the closing of the mould or of the vacuum bag. The fibres of the dry preform can be, for example, carbon, glass, or Kevlar fibres;
- a step of injecting the resin until total impregnation of the fibre preform, followed by a partial polymerisation; and
- a step of removing the connection part from the mould, without removing the fabric to be delaminated, in order to protect the surface of the connection part until the gluing operation (during the assembly).

Figure 13:
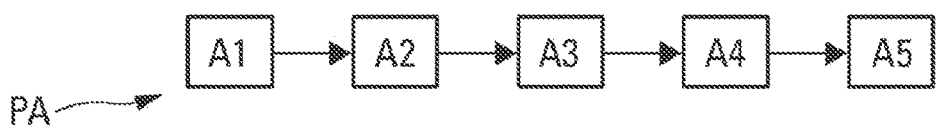

The connection part 1, as described above and as produced for example by the production method PF described above, is assembled with at least one of the mechanical parts and preferably with both mechanical parts P1 and P2, using an assembly method PA shown in FIG. 13.

This assembly method PA includes at least one step A4 of final polymerisation of the connection part 1 which is brought, for this purpose, into contact at least with one of said mechanical parts, in particular the mechanical part P1 in the example of FIGS. 10 and 11.

Said assembly method PA also includes the following steps:
- a step A1 of peeling off (or removing) the fabric to be delaminated (in the case of presence of such a fabric), and of surface preparation (degreasing) before the positioning of the connection part 1 on the mechanical part P1 at the location of the gluing, as shown in FIG. 10. Several connection parts 1 can be positioned on the same mechanical part P1. Once the connection part 1 has been positioned on the mechanical part P1, since the surface 3 (preferably flat) of the supporting part 4 of the connection part 1 and the surface 21 (having any given shape) of the mechanical part P1 in contact are generally different, they have a clearance 22 that can be significant with a variable air gap, as shown in FIG. 10;
- a step A3 of positioning suitable environmental products (including products for protection of sensitive zones of the part), and a usual vacuum bag; and
- the step A4 of final polymerisation until complete polymerisation, in an autoclave or in an oven, of the assembly (namely the connection part, the mechanical part and an optional adhesive at the interface). During the rise in temperature, the resin of the connection part 1, partially polymerised, once again becomes sufficiently fluid (because of a decrease in viscosity) to allow the connection part 1 to adapt or conform (without stress) exactly to the shape of the surface 21 of the mechanical part P1, as shown in FIG. 11.

Moreover:
- if the mechanical part P1 onto which the connection part 1 must be glued is completely polymerised, there is a step A2 with a preliminary operation of preparing the surface 21 of the mechanical part P1, at the location of the gluing (degreasing, sanding, cleaning), followed by an operation of adding an adhesive film; and
- if the mechanical part P1 onto which the connection part 1 must be glued is not polymerised (or even partially polymerised), the gluing operation resembles co-curing. It is not necessary to carry out a preliminary surface preparation of the mechanical part P1 at the location of the gluing (or just a degreasing in the case of a partially polymerised part P1). Moreover, the addition of an adhesive film at the interface is optional in this case.

Moreover, the assembly method can comprise, before the step A4 of final polymerisation, a step of conforming with local heating at least of one of the connection parts 1 brought into contact with the mechanical part P1, for example using a portable heating tool. This step can allow to simplify the maintaining of the connection part 1, and to simplify the placement of the environmental products before the final polymerisation and thus the final quality of the polymerised assembly.

The assembly obtained has a hot gluing zone with a controlled thickness of adhesive, good mechanical strength and good reliability of the gluing because of the co-curing.

If necessary, the operation of assembly of the ball 10 onto the connection part 1 can be carried out at two different times, namely before or after the assembly with the mechanical part P1.

When the assembly operation is carried out before the assembly with the mechanical part P1, the following actions are implemented:

- positioning of the ball 10 in the housing 5;
- placement of the maintaining element 13 representing the second part of the housing 5. If this additional part (maintaining element 13) is completely polymerised, it is in particular possible to position an adhesive between the connection part 1 and this maintaining element 13;
- placement of the connection part 1 equipped with the ball 10 on the mechanical part P1 (like in FIG. 9), with or without adhesive at the interface, and polymerisation of the assembly; and
- once the adjustments of the position of the ball 10 have been set, gluing at ambient temperature of the ball 10 in its housing 5.

Moreover, when the operation of assembly of the ball 10 is carried out after the assembly with the mechanical part P1 (like in FIGS. 6A to 8), the following actions are carried out:

- removal of the protections of the geometry of the housing 5 of the ball 10 used during the final polymerisation;
- placement of the ball 10 and of the maintaining element 13 at the housing 5. It is possible to fasten and/or glue at ambient temperature the maintaining element 13 onto the wall 6 of the housing 5; and
- once the adjustments of the position of the ball 10 have been set, gluing at ambient temperature of the ball 10 in its housing 5.

Figure 14A:
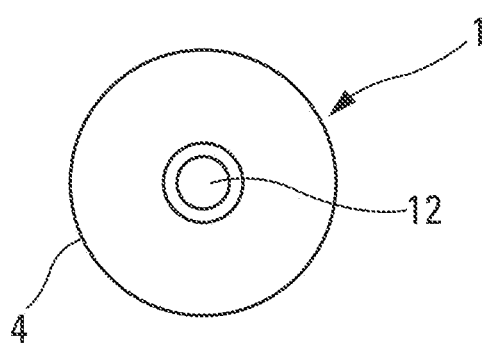
FIGS. 14A to 14F schematically show various possible shapes for a supporting part of the connection part, viewed from above.
Figure 14B:
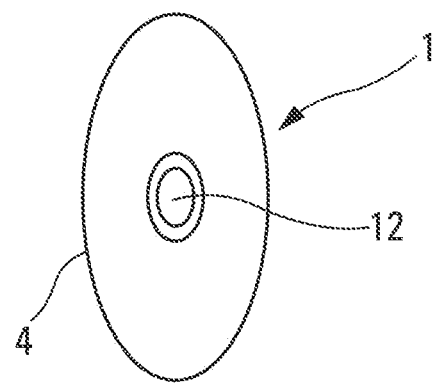
Figure 14C:
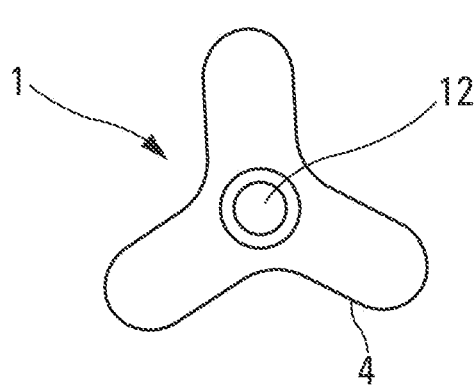
Figure 14D:
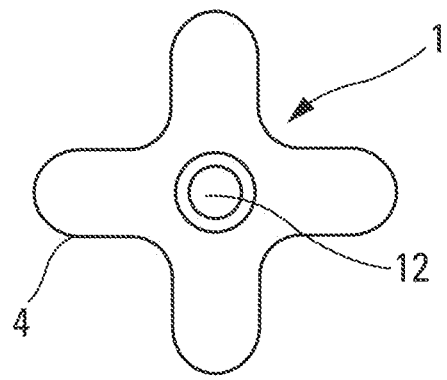
Figure 14E:
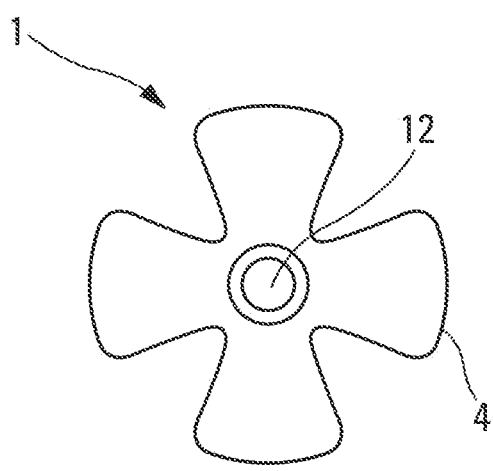
Figure 14F:
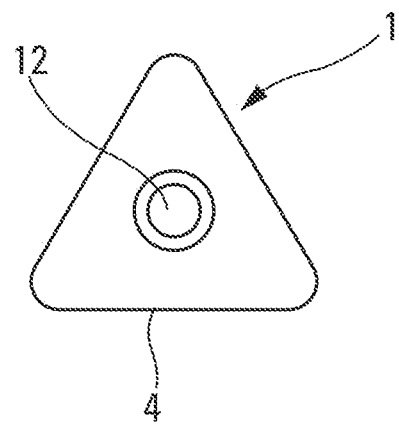

To facilitate the connection of the connection part 1 with a mechanical part, like in the example of FIGS. 10 and 11, the supporting part 4 can have varied shapes. FIGS. 14A to 14F show, for illustrative purposes, various possible shapes for the supporting part 4 (or base) of the connection part 1, viewed from above. These shapes can for example be round (FIG. 14A), elliptical (FIG. 14B), with various branches (FIGS. 14C to 14E), or triangular (FIG. 14F).

The present invention has numerous advantages. In particular, it allows:

- to obtain standardised connection parts 1, which can be stored and handled at ambient temperature;
- to hot assemble all the connection parts 1 with one or more mechanical parts, in particular in a single operation;
- to adapt each connection part 1 to the shape of the interface, during the final polymerisation; and
- to obtain a glued connection equivalent to a connection by co-curing (in the case of assembly with a non-polymerised or partially polymerised structure (or mechanical part)).

For illustrative purposes, for the aforementioned use for a shell of a satellite antenna reflector, the assembly of the connection parts is carried out during the drape forming of the shell. The connection parts are positioned on the shell regardless of the shape of the interface, with or without adhesive film at the interface. During the final polymerisation of the assembly, the resin of the connection parts, partially polymerised, softens sufficiently to allow the connection parts to conform exactly to the shape of the shell, without inducing mechanical stresses on the shell, while ensuring good mechanical strength of the connection at the interface.

What is claimed is:

1. Connection part made of composite material, intended to create a connection between a first mechanical part (P1) and a second mechanical part (P2), said connection part (1) being made of a partially polymerised thermohardenable material which is rigid at ambient temperature and capable of being subjected to a final later polymerisation, said connection part (1) comprising, at a second end (2B) intended for the connection to the second mechanical part (P2), a housing (5) and a ball (10) mounted in the housing (5), said ball (10) including a spherical part (11) inserted into the housing (5) and a rod (12) rigidly connected to the spherical part (11), said housing (5) being delimited by a wall (6) and a plug (17) made of pre-polymerised material, said wall including a first opening located at a first end (2A) of the connection part and a second opening located at the second end (2B) of said connection part, said plug (17) closing the first opening, wherein the rod (12) of the ball (10) extends through the second opening and wherein the plug (17) surrounds a part of the spherical part (11) of the ball located at an opposed part of said spherical part from which said rod (12) extends, wherein the ball (10) is held in position in said housing (5) by gluing.

2. Connection part according to claim 1, further comprising, at the first end (2A) intended for the connection to the first mechanical part (P1), a substantially flat surface (3).

3. Connection part according to claim 1, further comprising at least a metal element (9A) mounted in the wall (6) of the housing (5).

4. Connection part according to claim 1, further comprising metal or polymerised composite elements (9B) mounted on inner walls (6) of the housing (5) in order to maintain the geometry of the housing (5) during the final polymerisation.

5. Connection part according to claim 1, wherein the connection part is partially polymerised with a partial polymerisation rate between 20% and 75%.

6. Method for producing a connection part according to claim 1, said production method being a method (PF) for compression moulding, and comprising at least:
   - a step (F2) of drape forming in a mould with non-polymerised pre-impregnated material;
   - a step (F5) of partial polymerisation of said material; and
   - between the step (F2) of drape forming and the step (F5) of partial polymerisation, a step of integrating a fabric to be delaminated.

7. Production method according to claim 6, further comprising, before the step (F2) of drape forming, a step (F1) of positioning metal elements (9A, 9B) in the mould.

8. Method for assembling a connection part according to claim 1, comprising at least:
   - one step (A4) of final polymerisation of the connection part (1) brought into contact at least with one (P1) of said mechanical parts (P1, P2); and
   - a step of positioning a ball (10).

9. Assembly method according to claim 8, further comprising, before the step (A4) of final polymerisation of the connection part (1), a step of conforming with local heating of the connection part (1) brought into contact at least with one of said mechanical parts (P1, P2).

10. Assembly method according to claim 8, further comprising a step (A2) of adding an adhesive film onto the mechanical part (P1).

* * * * *